United States Patent [19]

Stark et al.

[11] 4,148,491
[45] Apr. 10, 1979

[54] PHONOGRAPH RECORD ADAPTER

[76] Inventors: Martin F. Stark, 47 Old Orchard Rd., Sherborn, Mass. 01770; Robert L. Whalen, 5 Howland St., Cambridge, Mass. 02138

[21] Appl. No.: 867,386

[22] Filed: Jan. 6, 1978

[51] Int. Cl.² .................................... G11B 23/02
[52] U.S. Cl. ........................................... 274/1 R
[58] Field of Search ......................... 274/1 R, 42 R

[56] References Cited

U.S. PATENT DOCUMENTS

| | | | |
|---|---|---|---|
| 1,062,579 | 5/1913 | Aylsworth | 274/39 R |
| 1,172,533 | 2/1916 | Kane | 274/42 R |
| 1,812,550 | 6/1931 | Penteado | 274/42 R |
| 1,904,490 | 4/1933 | Mallina | 274/39 R |
| 2,069,827 | 2/1937 | Harrison | 274/39 R |
| 2,285,139 | 6/1942 | Andres | 274/42 R |
| 2,344,919 | 3/1944 | Kelly | 274/42 R |

*Primary Examiner*—Steven L. Stephan
*Attorney, Agent, or Firm*—Scott R. Foster

[57] ABSTRACT

A phonograph record adapter comprising a rigid ring adapted to receive a standard phonograph record therein, a flange extending inwardly of the ring, the interior diameter of the flange being less than the diameter of the record, the flange being adapted to engage and overlie a surface of the record and being further adapted to exert a force upon the record when the record is in playing position to substantially negate the effects of warpage in the record, and spring biasing means mounted on interior portions of the ring and engageable with the record to center the record.

1 Claim, 2 Drawing Figures

PHONOGRAPH RECORD ADAPTER

BACKGROUND OF THE INVENTION

1. Field of the Invention

This invention relates to phonograph record-playing devices and is directed more particularly to an adapter for negating the effects of warpage in a record being played.

2. Description of the Prior Art

Though phonograph records and record-playing equipment have reached a degree of high sophistication, the system performs well only so long as the record maintains relatively planar integrity. Once the record has begun to warp, as records are prone to do, the degree of sophistication of the equipment is of reduced utility and thereafter little pleasure can be gained from the record.

Inasmuch as warpage of records is perhaps the weakest link in a chain of otherwise high integrity apparatus, it is desirable to provide some means for accommodating warped records so that they may be enjoyed for an extended period and not subject to early discarding.

U.S. patent application Ser. No. 802,728 filed in the names of Martin F. Stark, et al, discloses an adapter which may be placed upon a record in playing position and negate the effects of warpage thereon.

While the device disclosed in the above-mentioned application effectively negates warpage in a phonograph record, it has been found desirable to provide means for centering the record within the adapter.

SUMMARY OF THE INVENTION

An object of the present invention is to provide an adapter which may be placed upon a record in playing position and exercise an influence on the record so as to negate the effects of warpage thereon while the record is being played.

A further object is to provide such a device having means thereon for centering the record within the adapter.

A still further object of the invention is to provide such a device as is inexpensive and non-complex in manufacture, and easy to use from a consumer standpoint.

With the above and other objects in view, as will hereinafter appear, a feature of the present invention is the provision of a phonograph record adapter comprising a rigid ring having an inside diameter slightly greater than the outside diameter of a standard size phonograph record and adapted to receive said phonograph record therein, a flange extending inwardly of the ring, the interior diameter of the flange being less than the diameter of the phonograph record and adapted to engage and overlie a surface of the phonograph record and further adapted to exert a force upon the record when the record is in playing position to substantially negate the effects of warpage in the record while the record is being played, and spring biasing means mounted on interior portions of the ring and engageable with the record to center the record within the ring.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

DESCRIPTION OF THE PREFERRED EMBODIMENT

Figure 1:
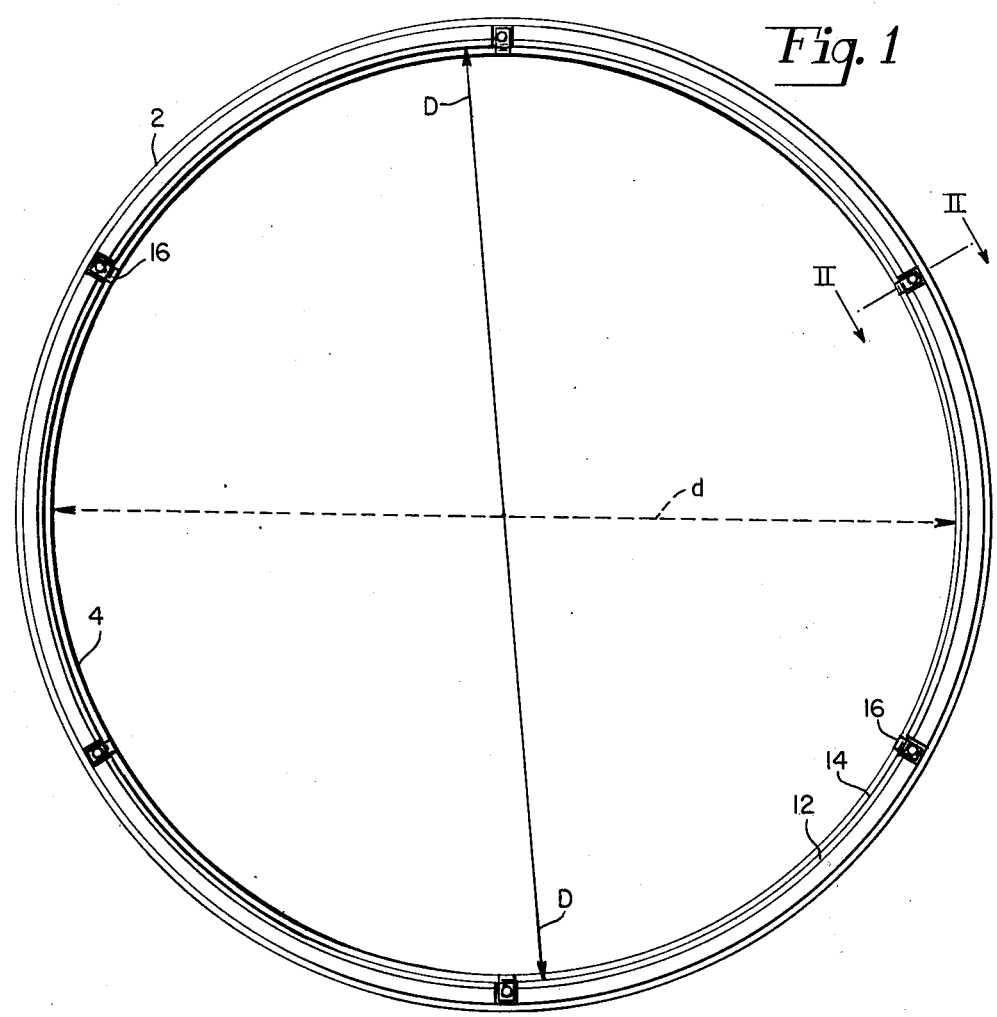
FIG. 1 is a bottom plan view of one form of adapter illustrative of an embodiment of the invention.

Referring to FIG. 1, it will be seen that the illustrative device comprises a rigid ring 2, preferably of metal, provided with an inwardly extending flange 4. The inside diameter D of the ring 2 is slightly greater than the outside diameter of a standard "long play" phonograph record and the ring 2 is adapted to receive a phonograph record therein. The inside diameter d of the flange 4 is smaller than the aforementioned record diameter and is adapted to engage a surface S of a record R, as shown in FIG. 2.

Figure 2:
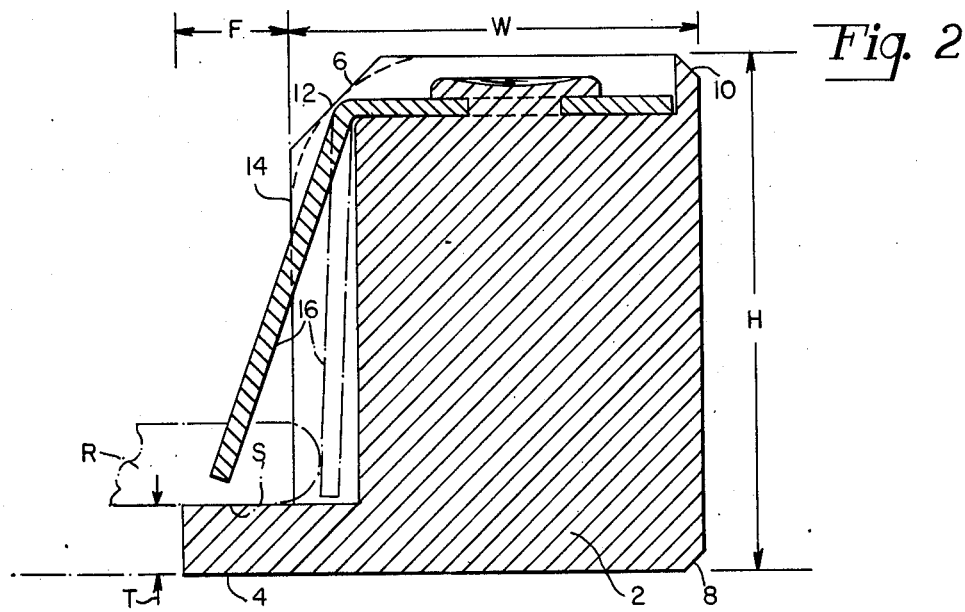
FIG. 2 is a sectional view taken along line II—II of FIG. 1.

Referring to FIG. 2, it will be seen that in cross-section the ring 2 is substantially rectangular in shape, with the flange 4 extending therefrom. The lower inner portion 6 of the ring 2 is beveled (as shown in solid lines) or rounded (as shown in phantom) to provide guidance for the ring 2 when being disposed upon the record R. Preferably, additional edges 8, 10 are rounded to facilitate safe and easy handling of the device.

The ring 2 is preferably of a width W of 0.25 inch and a height H of 0.31 inch. The flange 4 extends inwardly from the ring 2 a distance F of about 0.06 inch. The flange is preferably about 0.02 inch in thickness T. In its simplest form, the weight of the device must be sufficient to exert a downward force on the record such as will accomplish the purpose. On the other hand, the weight must not be so great as to affect the speed of the turntable on which the record rests. Accordingly, it is believed that the weight of the device should be at least 8 ounces and should be no more than about 50 ounces. It will be apparent that for some turntables a maximum weight should be less than 50 ounces.

The material from which the ring 2 is made must be rigid so as to be immune itself from warpage and must be heavy enough to provide the desired effect. Consequently, metal is preferred, and brass and zinc, or alloys thereof, have been found to be ideally suited.

Records are manufactured with relatively high variance as to the outside diameter dimension. Accordingly, it cannot be expected that the inside surface 14 of the ring will in each instance engage the outer edge of the record. To insure that the ring is symmetrically located on the record, the ring is provided with means for centering the ring upon the record, thereby centering the record within the ring. The means for centering the record within the ring comprises a biasing means fixed to the ring and operable to engage the record when the adapter is disposed thereon.

In the embodiment shown, the biasing means comprises a plurality of leaf springs 16 disposed on the interior of the ring and operable to engage the edge of the record R and maintain the record in a centered position.

In use, when it is desired to play a warped record, the record R is placed on a turntable and the adapter 2 placed upon the record, the edge of the record engaging the radius or bevel 12 (FIG. 2) and sliding along or proximate to, the inside surface 14 of the ring 2 until the peripheral edge of the record engages the springs 16 and the upper surface S of the record engages the under surface of the flange 4, at which point the adapter rests upon the record, the flange 4 overlying the edge portion of the record. The springs 16 urge the ring to a symmetrical position on the record. Inasmuch as the inward extent of the flange is only about 0.06 inch, the flange does not interfere with the playing portion of the record and engages only a portion of the lead-in section at the periphery of the record. The weight of the ring, which is evenly distributed about its extent, negates the effect of the record warpage while the record is being played. Upon removal of the ring the warpage returns; accordingly, the adapter must be used with each playing of the warped record.

It is to be understood that the present invention is by no means limited to the particular construction herein disclosed and/or shown in the drawings, but also comprises any modifications or equivalents within the scope of the disclosure. For example, the invention has been shown and described in its simplest form in which it comprises a unitary object manually placed upon a horizontally disposed record, and in such instance the mass of the ring and its reaction to gravitational forces exert the desired force upon the record. However, it will be apparent that the present invention could be biased against a vertically disposed record and obtain the desired result. It will also be apparent that while the ring is shown as a unitary object, in particular applications where the ring is applied automatically rather than manually it might be desirable that the ring be broken into a plurality of sections with each section being held and moved automatically into and out of position. Thus, the term "rigid ring" is not meant to be limited to a unitary object.

As a further example of modifications or equivalents within the scope of the disclosure, though the biasing means has been illustrated as a plurality of leaf springs, it could alternatively be in the form of a ring of elastomeric material, or elastomeric bodies spaced about the interior of the ring. Other appropriate biasing means include spring-biased plungers disposed radially in the ring, and the like.

Having thus described my invention, what I claim as new and desire to secure by Letters Patent of the United States is:

1. A phonograph record adapter comprising a rigid ring having a top surface and a bottom surface with an inside wall surface extending therebetween, the diameter of said ring at said inside wall surface being slightly greater than the outside diameter of a phonograph record, said ring being adapted to receive said phonograph record therein, a flange extending inwardly of said ring, the interior diameter of said flange being less than the diameter of said phonograph record, said flange being adapted to engage and overlie a surface of said phonograph record, said adapter being adapted to exert a force upon said record when said record is in playing position to substantially negate the effects of warpage in said record so long as said adapter is disposed thereon, said bottom wall being provided with a plurality of first recess portions and said inside wall surface being provided with a plurality of second recess portions in alignment respectively with said first recess portions, and a leaf spring member disposed in each of said recesses, a first portion of said leaf spring member being fixed to said ring in one of said first recess portions, and a second portion of said leaf spring member being inclined from said first portion and extending inwardly of said ring toward said flange, said second portion of said leaf spring member being engageable with an edge portion of said record to center said record in said ring and being adapted to enter one of said second recess portions.

* * * * *